United States Patent [19]
Bergner et al.

[11] Patent Number: 5,136,429
[45] Date of Patent: Aug. 4, 1992

[54] MODULAR ILLUMINATION EQUIPMENT

[75] Inventors: Joachim Bergner; Burkhard Bufe, both of Jena; Hubert Wahl, Stadtroda, all of German Democratic Rep.

[73] Assignee: Jenoptik Jena GmbH, Jena, Fed. Rep. of Germany

[21] Appl. No.: 508,152

[22] Filed: Apr. 11, 1990

[30] Foreign Application Priority Data

Jun. 2, 1989 [DD] German Democratic Rep. ................................ 3291870

[51] Int. Cl.⁵ .............................. G02B 3/00
[52] U.S. Cl. ......................... 359/663; 359/740
[58] Field of Search ............... 350/415, 450, 425

[56] References Cited
U.S. PATENT DOCUMENTS 4,592,625 6/1986 Uehara et al. ............... 350/415

FOREIGN PATENT DOCUMENTS 2635142 3/1977 Fed. Rep. of Germany.
2846056 4/1979 Fed. Rep. of Germany.
3113843 1/1982 Fed. Rep. of Germany.
0316817 12/1988 Japan ................................. 350/415

OTHER PUBLICATIONS

Beyer-Riesenberg: Handbuch der Mikroskopie, 3rd Edition, Berlin 1988, p. 145.
Jenaer Rundschau 28, 1983, pp. 61, 62.

Primary Examiner—Paul M. Dzierzynski
Attorney, Agent, or Firm—Jordan and Hamburg

[57] ABSTRACT

Modular illumination system for transmitted-light microscopes, embodying the Koehler illumination principle, and usable on microscopes of short or long optical transmission length, including a telecentering lens disposed in the light beam path defined according to Koehler between the luminous field diaphragm and the aperture diaphragm and imaging the luminous field diaphragm at infinity the telecentering lens is displaceable, preferably perpendicularly to the optical axis.

4 Claims, 2 Drawing Sheets

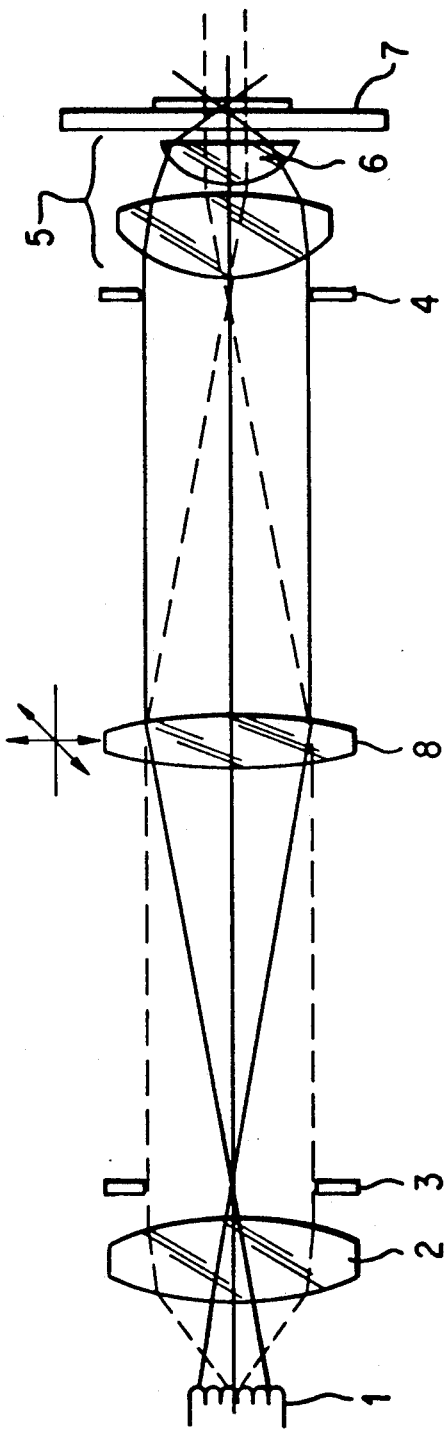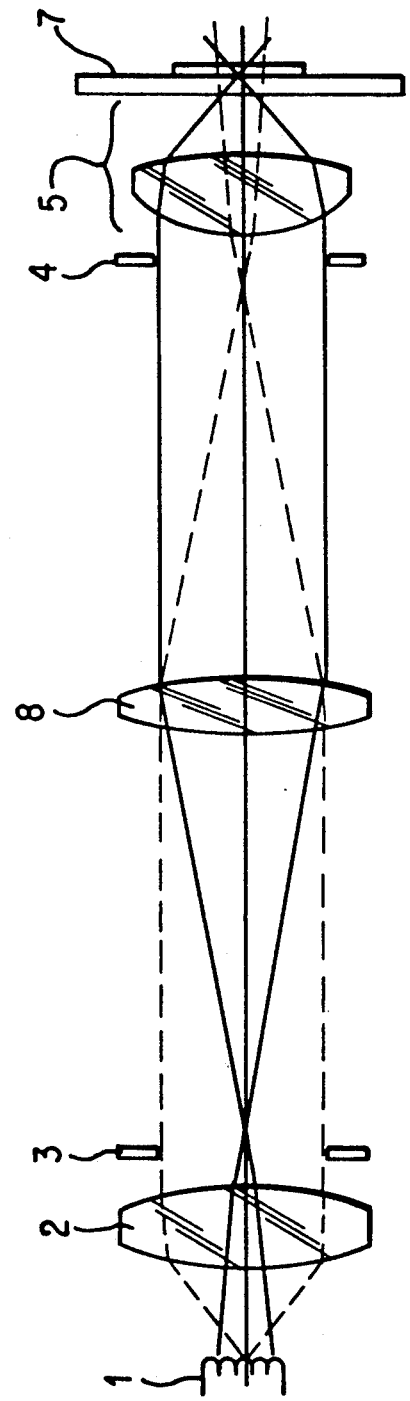

MODULAR ILLUMINATION EQUIPMENT

FIELD OF THE INVENTION

The invention relates to an illuminator employing the Koehler principle of illumination for a transmitted light microscope. It is used preferably in transmitted-light microscopes which belong to a series including several types of microscopes in which a large assortment of optical and mechanical components, and easy interchangeability of light sources of different power with easy is required.

BACKGROUND OF THE INVENTION

In the classical Koehler illumination principle, a light source situated at a finite distance from a condenser is imaged by a field lens directly into the aperture diaphragm of this condenser, and the field diaphragm disposed behind the field lens is imaged by the condenser into the specimen plane (Beyer-Riesenberg: Handbuch der Mikroskopie, 3rd Edition, Berlin 1988, p. 145). Different distances between the light source and field diaphragm and the specimen plane (optical transmission distance) require a particular sizing and correction of the imaging systems for each specific microscope. In the case of great transmission lengths this result in lens diameters for a given focal length which are no longer usable.

A Variosystem (DE-PS 26 35 142) is known which has a finite light path and produces real intermediate images of the light source and field diaphragm. This Variosystem, however, is not economically feasible for simple educational microscopes.

In another known illumination system according to DE-PS 28 46 056, in addition to different condenser systems, different aperture diaphragms lying in different planes are provided, and therefore, again, the illumination of specimen fields and apertures calls for considerable complexity.

For the illumination of specimen fields and apertures of different sizes, a known illumination system according to DE-PS 31 13 843 provides two interchangeable relay lens systems which receive an intermediate image of the light source projected by the field lens at a finite distance and image it at a finite distance (System 1) or at an infinite distance (System 2). Aside from the increased expense involved in the use of relay lens systems, the telecentric imaging of the light source in the specimen field when the magnification of the microscope objective is low leads as a rule to shading of the illuminated specimen field by the imaging optical systems that follow.

Microscopes are also known in which, for the advantageous placement of optical components such as polarizers or interference contrast prisms in the telecentric light path, the luminous field diaphragm is imaged in infinity (Jenaer Rundschau 28 (1953) 2 61 . . . 62). For light-source imaging at infinity, however, a specially constructed intermediate imaging system is required for each of the microscope illuminators that can be used, due to the great optical transmission length.

It is common to all of the above-mentioned illumination systems that they are each intended for a specific structure of the microscope with a given optical transmission length, and it is not possible to employ them using the same components for microscopes of different optical transmission length.

SUMMARY OF THE INVENTION

The object of the invention is to provide a modular illumination system which will be flexibly applicable to transmitted-light microscopes, which will not have the above-described disadvantges of the state of the art, and which can be manufactured with little difficulty or expense.

The invention is directed to the provision of a modular illumination system for transmitted-light microscopes, which can be used both in microscopes of great optical transmission length and in microscopes of short optical transmission length between light source and specimen plane, while for reasons of correction especially the entrance pupil is the same for the condensers to be used. The system permits the easy exchange of light sources of different power or physical quality without affecting, or only slightly affecting the centering of the light source image without making changes in the optical equipment within the microscope. In addition, the system is suitable both for the illumination of relatively small specimen fields with a large aperture or for the illumination of relatively large specimen fields with a small aperture, without additional component expense.

In accordance with the invention, a modular illumination system for transmitted-light microscopes which embodies the Koehler illumination principle, includes a light source of small luminous surface of great luminous density, at least two lenses for imaging this light source, a luminous field diaphragm and an aperture diaphragm whose apertures are continuously variable, and a preferably multilens condenser. A telecentric lens is provided between the luminous field diaphragm and the aperture diaphragm. The telecentric lens images the luminous field diaphragm in infinity, and is preferably displaceable perpendicular to the optical axis.

Advantageous variations in accordance with the invention consist in the fact that the focal length $f_{TL}$ of the telecentric lens is established perferably in accordance with the relationship $$f_{TL} = f_n \cdot \frac{d}{\sqrt{a^2 + b^2}}$$

wherein $f_{TL}$ is the focal length of the telecentric lens, $f_K$ the focal length of the field lens d the maximum usable diameter of the opening of the aperture diaphragm, and a, b the side lengths of the luminous surface of the light source, the focus point of the telecentric lens on the condenser side lies in the front focal plane of the condenser, and the light source is situated optically in infinity and is imaged into the focal plane of the condenser, or the telecentric lens is disposed in the immediate vicinity of the front focal plane of the condenser and the light source is situated optically in infinity and is imaged into the front focal plane of the condenser, the front system of the condenser can be removed from the light path, the light source and the field lens form a unit which is removably mounted at a position in front of the luminous field diaphragm.

The manner of operation of the invention is described below.

The light source, in one embodiment of the invention, is imaged into infinity and is imaged by the field lens by the telecentric lens into the front focal plane of the condenser. The luminous field diaphragm is disposed in back of the field lens, is imaged by the telecentric lens into infinity and is imaged by the condenser into the specimen plane.

This arrangement is especially suitable for illumination systems of great optical transmission length.

For the illumination of speciment fields of objectives of low magnification, e.g., between 2.5 and 8.5 mm diameter, the back lens of the condenser (which has at least two lenses) is selected to have a focal length such that, it together with the telecentric lens, images the luminous field diaphragm in an appropriate size into the specimen plane when the condenser front system is removed.

An especially advantageous embodiment is achieved if the focal point of the back lens coincides in the specimen plane with the focal point of the complete condenser.

In another embodiment of the invention, which is suitable for short optical transmission lengths, the telecentric lens is disposed in the immediate vicinity of the front focal plane of the condenser, and the light source that is located optically in infinity is imaged into the front focal plane of the condenser.

By arranging the telecentric lens for displacement in a plane perpendicular to the optical axis, any slight misplacement of the luminous field diaphragm image can be equalized.

Combining the light source and the field lens as a single unit which is removably fastened at a coupling point insensitive to centering, in front of the luminous field diaphragm, permits the interchange of light sources of different light outputs or physical quality.

The image of the light source is advantageously so circumscribed within the aperture diaphragm that the diagonal of the light source image corresponds to the maximum useful diameter of the aperture diaphragm.

It is furthermore advantageous to arrange the telecentric lens and the luminous field diaphragm in a single modular unit.

It is possible with the same optical and mechanical components to equip both simple educational microscopes and more sophisticated general-purpose microscopes with the modular illumination system of the invention for transmitted-light microscopes.

The use of the same condensers further increases interchangeability of parts. The separation of the illumination from the microscope in the telecentric light path renders unnecessary the use of centering means on the light source and thus reduces the technical complexity.

The double-telecentric light path lastly permits the use of optical systems having diameter-to-focal length ratios that are desirable technically and economically.

BRIEF DESCRIPTION OF THE DRAWINGS

The invention will be further explained below with the aid of the embodiments diagrammatically represented in the drawings.

FIG. 1 shows the arrangement of the components of the modular illumination system for transmitted-light microscopes and the path of the rays in the case of a long optical transmission length, FIG. 2 illustrates the path of the rays in the modular illumination system of FIG. 1 with the front condenser system removed.

DETAILED DISCLOSURE OF THE INVENTION

Figure 3:
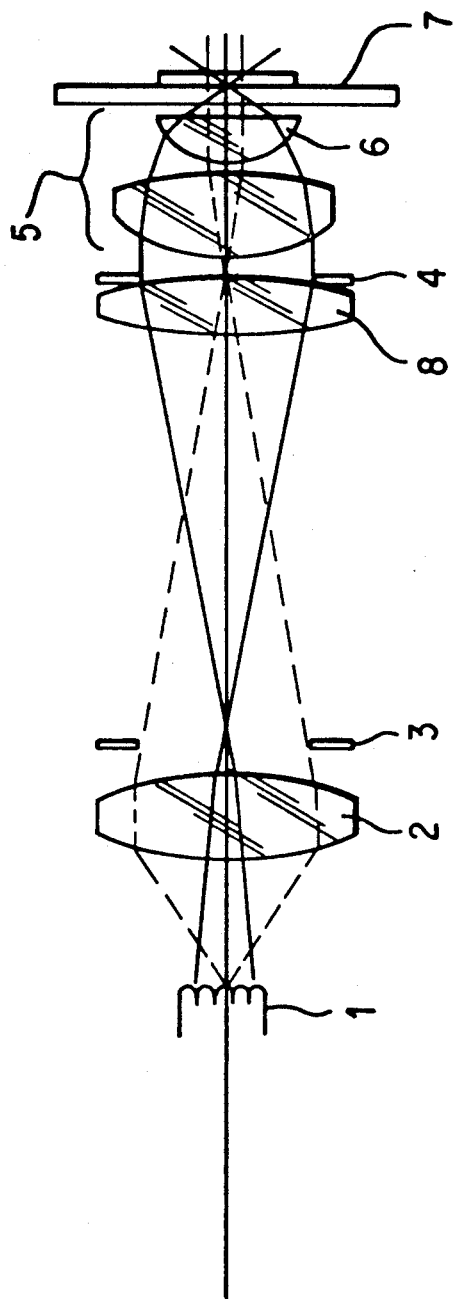
FIG. 3 shows a modification of the modular illumination system for a short optical transmission length.

In the modular illumination system in accordance with the invention for transmitted-light microscopes with different optical transmission lengths, with the light paths represented in FIG. 1 for long optical transmission lengths, the light source 1 is imaged by the field lens 2 at infinity, and by the telecentric lens 8 into the aperture diaphragm 4.

The luminous field diaphragm 3 located in back of the field lens 2 is imaged by the telecentric lens 8 to infinity, and by the condenser lenses 5, 6, to the specimen plane.

If the specimen field that is to be illuminated is greater than 2.5 mm in diameter at low microscope objective magnifications, and the front condenser system, as shown in FIG. 2, is removed from the light path, the telecentric lens 8 will then act in accordance with the invention as a large field lens with the advantage over the state of the art that the luminous field diaphragm is sharply imaged into the specimen plane.

Figure 4:
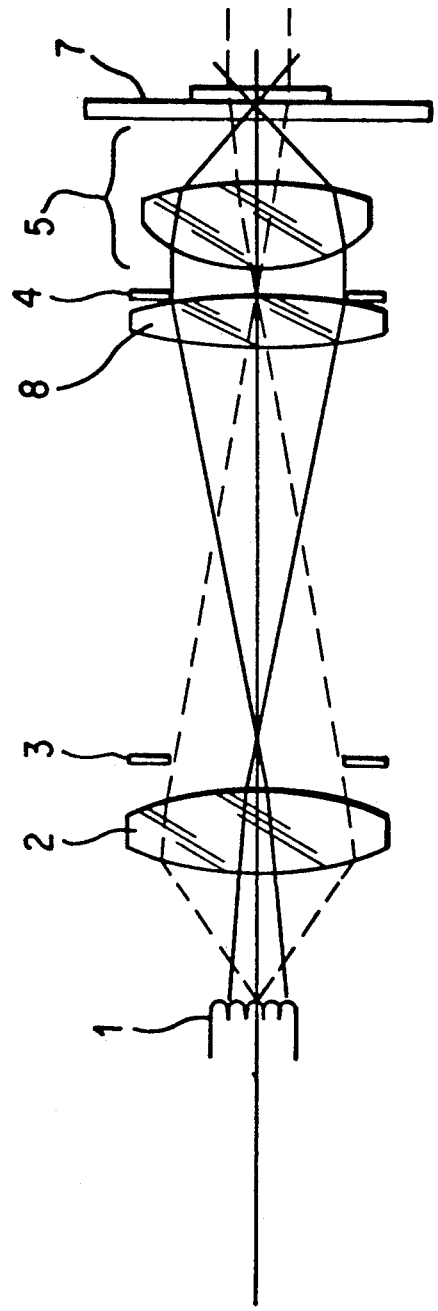
FIG. 4 illustrates an embodiment in accordance with FIG. 3, in which the front condenser system is likewise removed.

FIG. 3 illustrates the light path in an illumination system according to the invention having a short optical transmission length, using the same components as described above. The telecentric lens 8 is now disposed in the plane of the aperture diaphragm 4 or in its direct vicinity, and the light source 1 is directly imaged into this plane. Lastly, FIG. 4 shows the light path in the illumination system for the illumination of larger specimen fields with imaging of the luminous field diaphragm 3 into the specimen plane 7, after removal of the front condenser system 6.

Interchanging of light sources of different light output or physical quality, which is advantageous because it is insensitive within sufficient limits to centering, permits the uncoupling in accordance with the invention of the light source and field lens which are joined together as a unit between the field lens and the luminous field diaphragm.

The unit consisting of light source 1 and field lens 2 is separable from the luminous field diaphragm 3 together with the other parts of the modular illumination system built into the microscope body, and can be replaced with another unit, not shown, whose light source with the corresponding field lens is optically matched to the modular illumination system and forms a component unit in itself.

We claim:

1. In a modular illumination system for transmitted-light microscopes embodying the Koehler principle of illumination, and including a light source with a small luminous surface of great light density, at least two lenses for imaging said light source, a luminous field diaphragm and an aperture diaphragm, each of said diaphragms being continuously variable in aperture, and a condenser, the improvement comprising a telecentering lens which images to infinity and is mounted between the luminous field diaphragm and the aperture diaphragm, said telecentering lens being displaceable perpendicular to the optical axis, wherein a focal length $f_{TL}$ of the telecentering lens toward the condenser is in the front focal plane of the condenser and said light source located optically at infinity is imaged into said focal plane of the condenser, and said telecentering lens is dimensioned to have said focal length $f_{TL}$ according to the relationship $$f_{TL} = f_n \cdot \frac{d}{\sqrt{a^2 + b^2}}$$

wherein
$f_{TL}$ is the focal length of the telecentering lens,
$f_n$ is the focal length of a field lens,
d is the maximum useful diameter of the aperture of the aperture diaphragm, and
a and b are side lengths of a luminous area of the light source.

2. Modular illumination system for transmitted-light microscopes in accordance with claim 1, wherein said condenser includes front and rear condenser systems and the front condenser system is removable from the light path.

3. In a modular illumination system for transmitted-light microscopes embodying the Koehler principle of illumination, and including a light source with a small luminous surface of great light density, at least two lenses for imaging said light source, a luminous field diaphragm and an aperture diaphragm, each of said diaphragms being continuously variable in aperture, and a condenser, the improvement comprising a telecentering lens which images to infinity and is mounted between the luminous field diaphragm and the aperture diaphragm, said telecentering lens being displaceable perpendicular to the optical axis, wherein the telecentering lens is disposed in the direct vicinity of the front focal plane of the condenser and said light source located optically at infinity is imaged into said focal plane of the condenser, and said telecentering lens is dimensioned to have a focal length $f_{TL}$ according to the relationship $$f_{TL} = f_n \cdot \frac{d}{\sqrt{a^2 + b^2}}$$

wherein
$f_{TL}$ is the focal length of the telecentering lens,
$f_n$ is the focal length of a field lens,
d is the maximum useful diameter of the aperture of the aperture diaphragm, and
a and b are side lengths of a luminous area of the light source.

4. Modular illumination system for transmitted-light microscopes in accordance with claim 3, wherein said condenser includes front and rear condenser systems and the front condenser system is removable from the light path.

* * * * *